US011927822B2

(12) United States Patent
Pilon et al.

(10) Patent No.: US 11,927,822 B2
(45) Date of Patent: Mar. 12, 2024

(54) CROSS CONNECT SYSTEM AND TRAY

(71) Applicant: BELDEN CANADA ULC, Saint-Laurent (CA)

(72) Inventors: Vincent Pilon, Lachine (CA); Bruno Chabot, Montreal (CA)

(73) Assignee: BELDEN CANADA ULC, Saint-Laurent (CA)

( * ) Notice: Subject to any disclaimer, the term of this patent is extended or adjusted under 35 U.S.C. 154(b) by 461 days.

(21) Appl. No.: 16/791,061

(22) Filed: Feb. 14, 2020

(65) Prior Publication Data

US 2020/0183090 A1    Jun. 11, 2020

Related U.S. Application Data

(62) Division of application No. 16/376,072, filed on Apr. 5, 2019, now Pat. No. 10,768,387.

(60) Provisional application No. 62/653,771, filed on Apr. 6, 2018.

(51) Int. Cl.
*A47B 88/44*       (2017.01)
*G02B 6/44*        (2006.01)
*G02B 6/35*        (2006.01)

(52) U.S. Cl.
CPC ............ *G02B 6/4455* (2013.01); *A47B 88/44* (2017.01); *G02B 6/356* (2013.01)

(58) Field of Classification Search
CPC ........ A47B 88/44; A47B 88/45; G02B 6/356; G02B 6/4455
USPC .................................................. 312/334.46
See application file for complete search history.

(56) References Cited

U.S. PATENT DOCUMENTS

| | | | |
|---|---|---|---|
| 6,244,678 B1 * | 6/2001 | Dopp | A47B 88/493 |
| | | | 312/334.44 |
| 7,604,307 B2 * | 10/2009 | Greenwald | A47B 88/49 |
| | | | 312/334.46 |
| 8,585,166 B2 * | 11/2013 | Chen | A47B 88/493 |
| | | | 312/334.46 |
| 9,247,815 B2 * | 2/2016 | Chen | A47B 88/49 |

(Continued)

FOREIGN PATENT DOCUMENTS

WO    2008135425 A1    11/2008
WO    2019042980 A1    3/2019

OTHER PUBLICATIONS

English translation of WO2008135425A1.
English translation of WO2019042980A1.

*Primary Examiner* — James O Hansen
(74) *Attorney, Agent, or Firm* — Lavery de Billy, LLP; Hugh Mansfield

(57) ABSTRACT

A fiber optic cross connect system comprising a case defining a tray receiving space and at least one tray slideable in and out of the space between a first closed position, a second intermediate position and a third open or accessible position and a sliding engagement between a sidewall of the case and a side edge of the tray is disclosed. The sliding engagement comprises an elongate link member which is stationary as the tray is moved between the first closed position and the second intermediate position and moves with the tray as the tray is moved between the second intermediate and the third open position and such that the elongate link member does not interfere with fiber optic cables which are interconnecting external devices with devices on the tray. In a particular embodiment the link member is held stationary by a releasable locking mechanism.

19 Claims, 13 Drawing Sheets

(56) References Cited

U.S. PATENT DOCUMENTS

| | | | |
|---|---|---|---|
| 2005/0025444 A1 | 2/2005 | Barnes et al. | |
| 2006/0066190 A1* | 3/2006 | Hay | A47B 88/40 |
| | | | 312/333 |
| 2008/0018214 A1* | 1/2008 | Huang | A47B 88/49 |
| | | | 312/334.46 |
| 2016/0077298 A1* | 3/2016 | Wiltjer | G02B 6/4471 |
| | | | 211/126.15 |
| 2018/0003912 A1* | 1/2018 | Sedor | G02B 6/4452 |

* cited by examiner

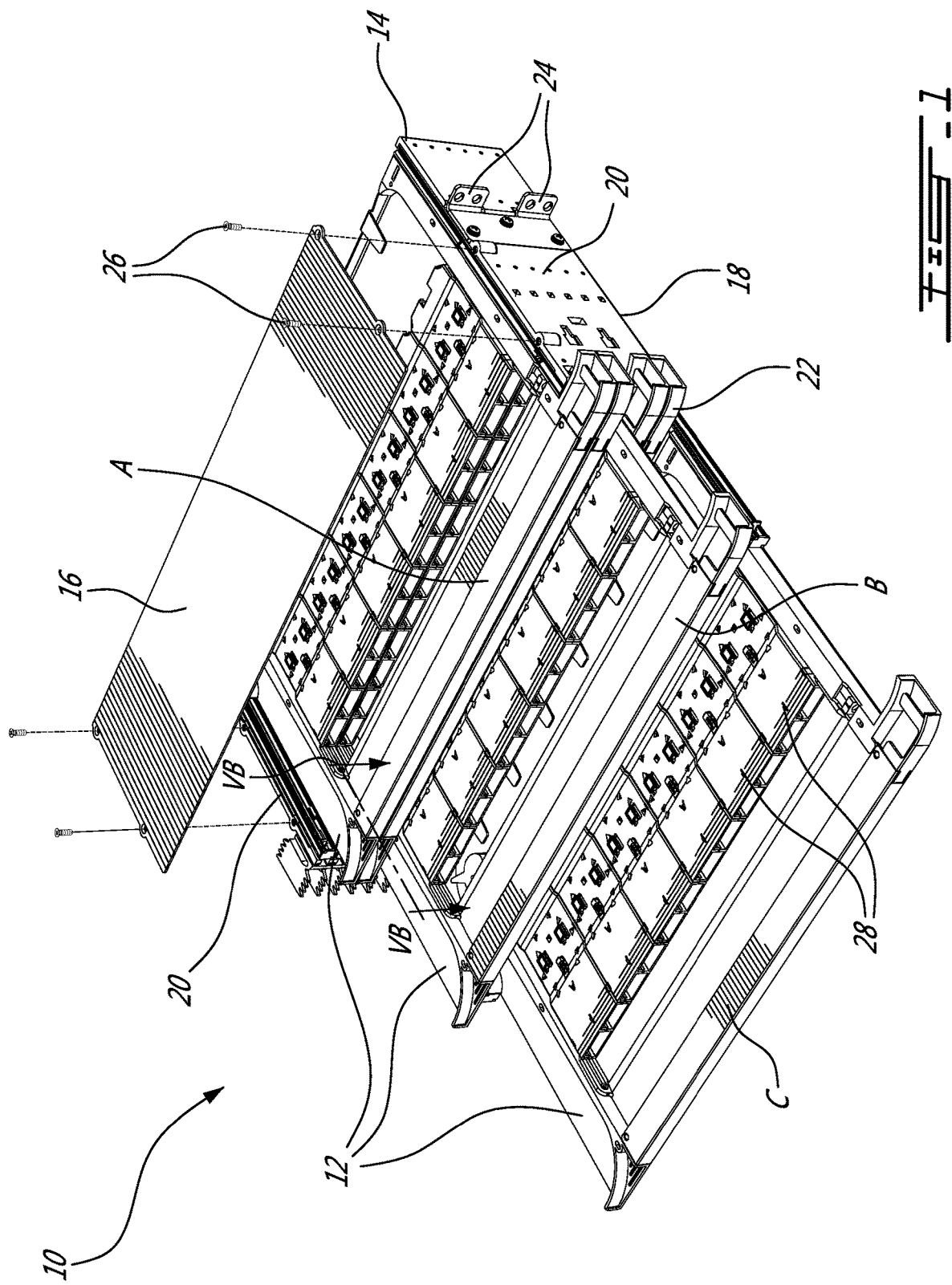

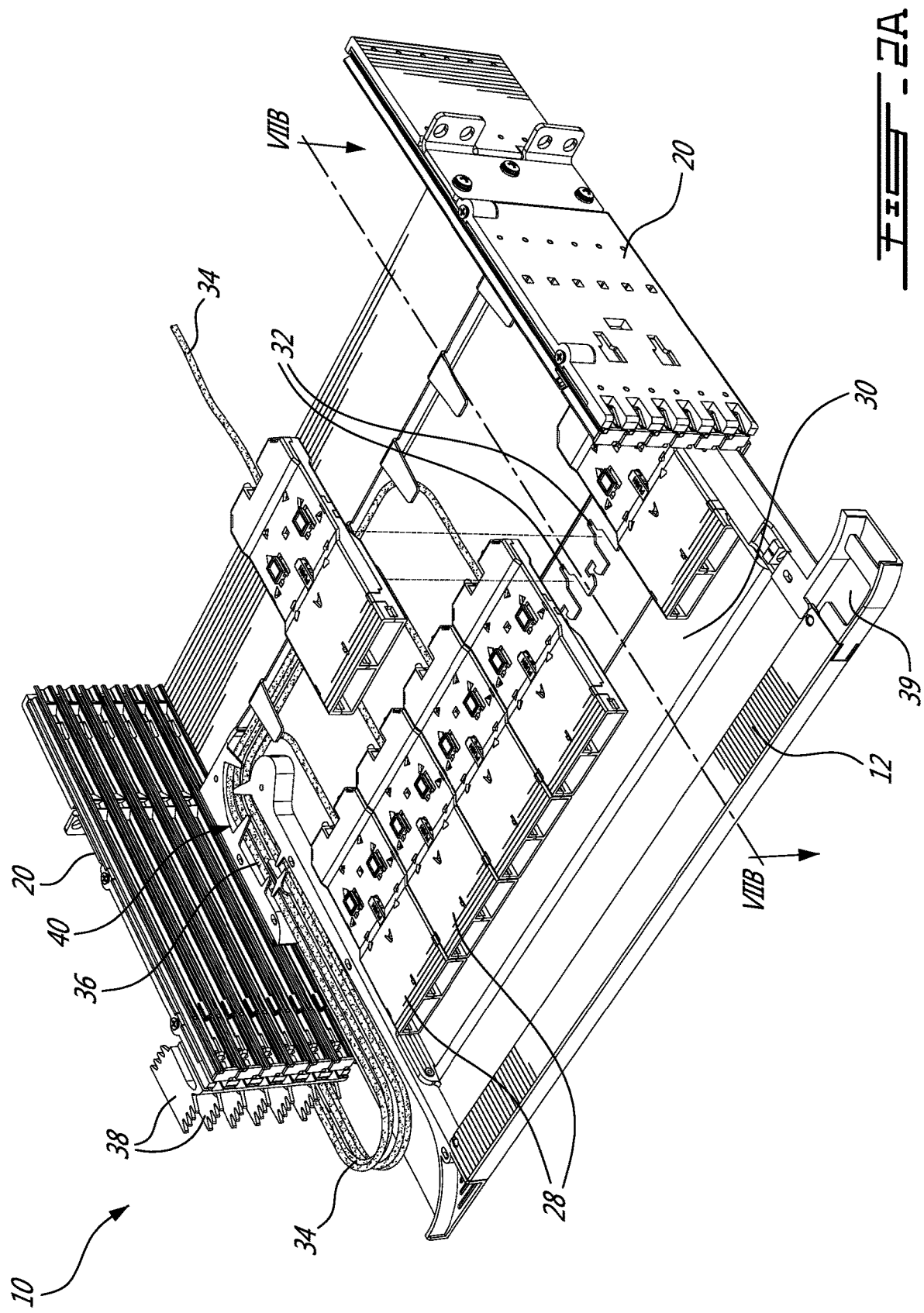

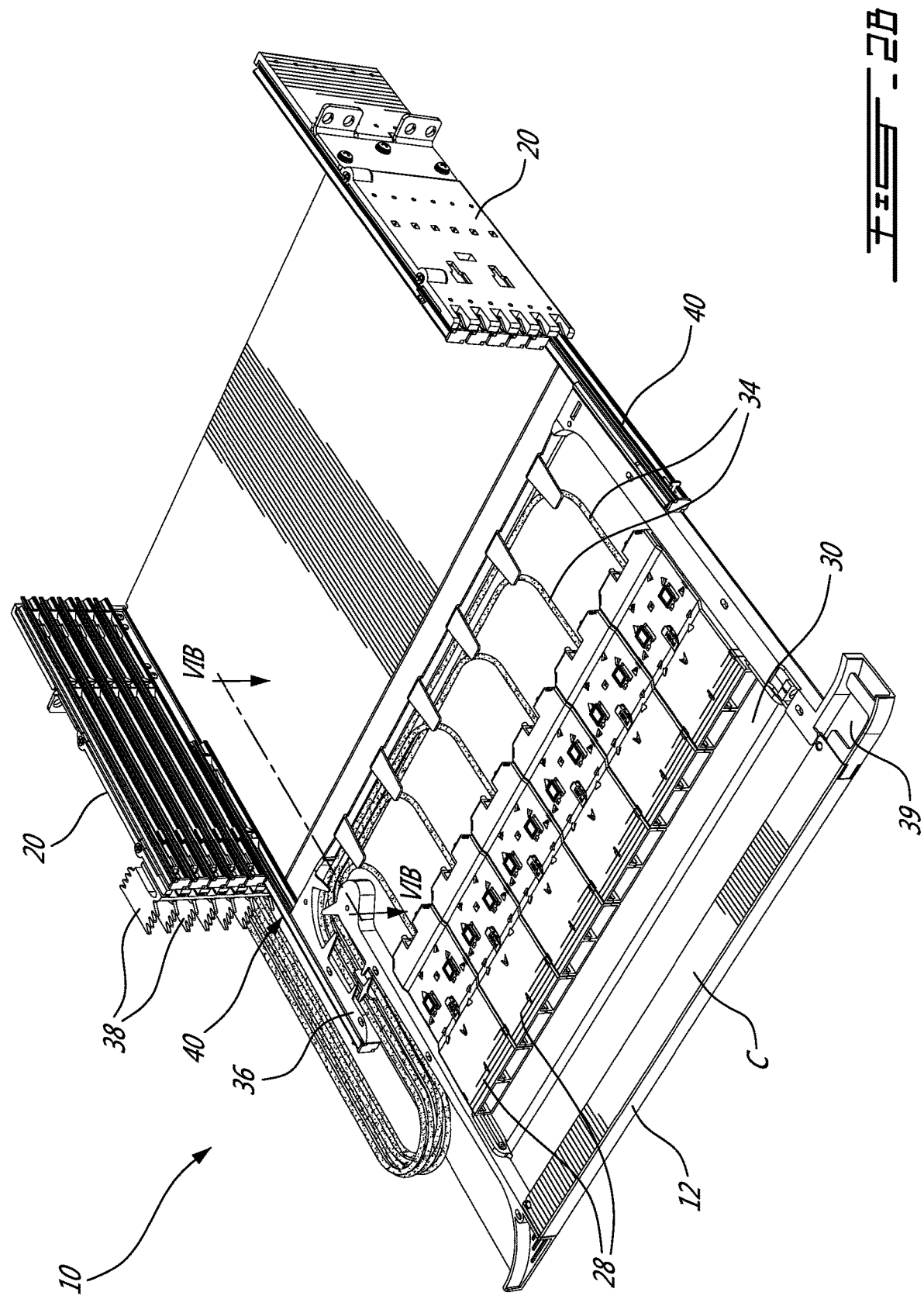

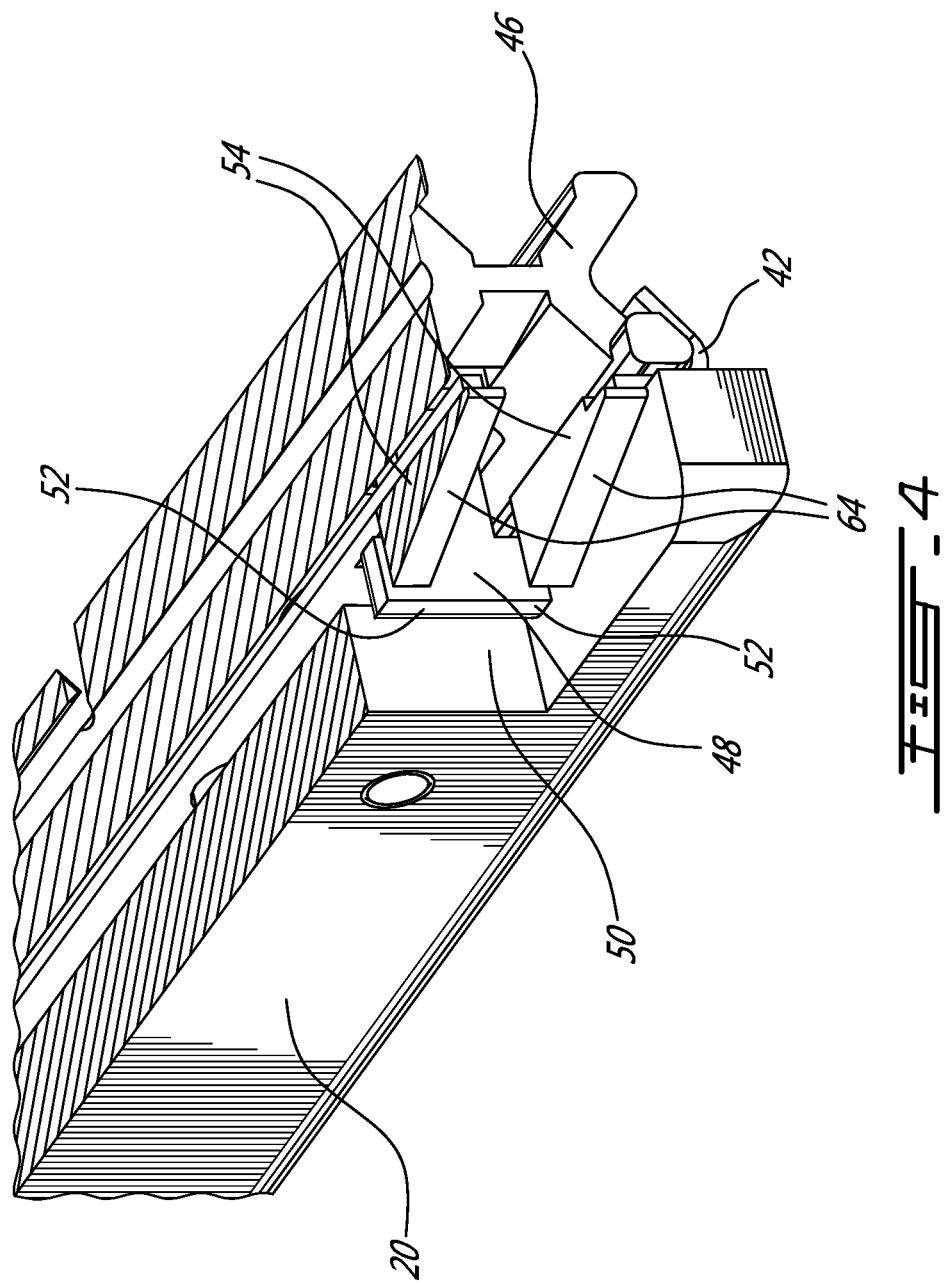

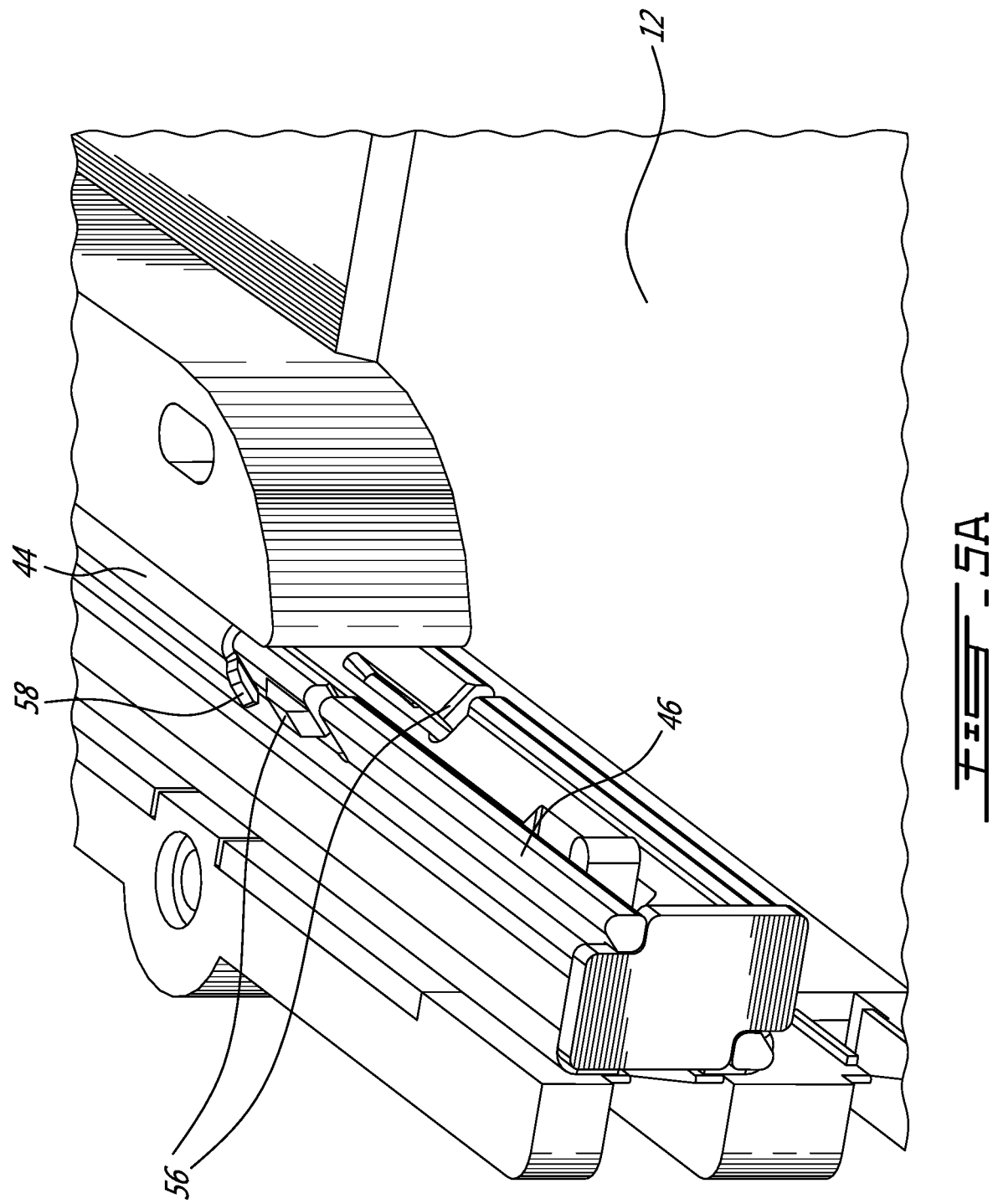

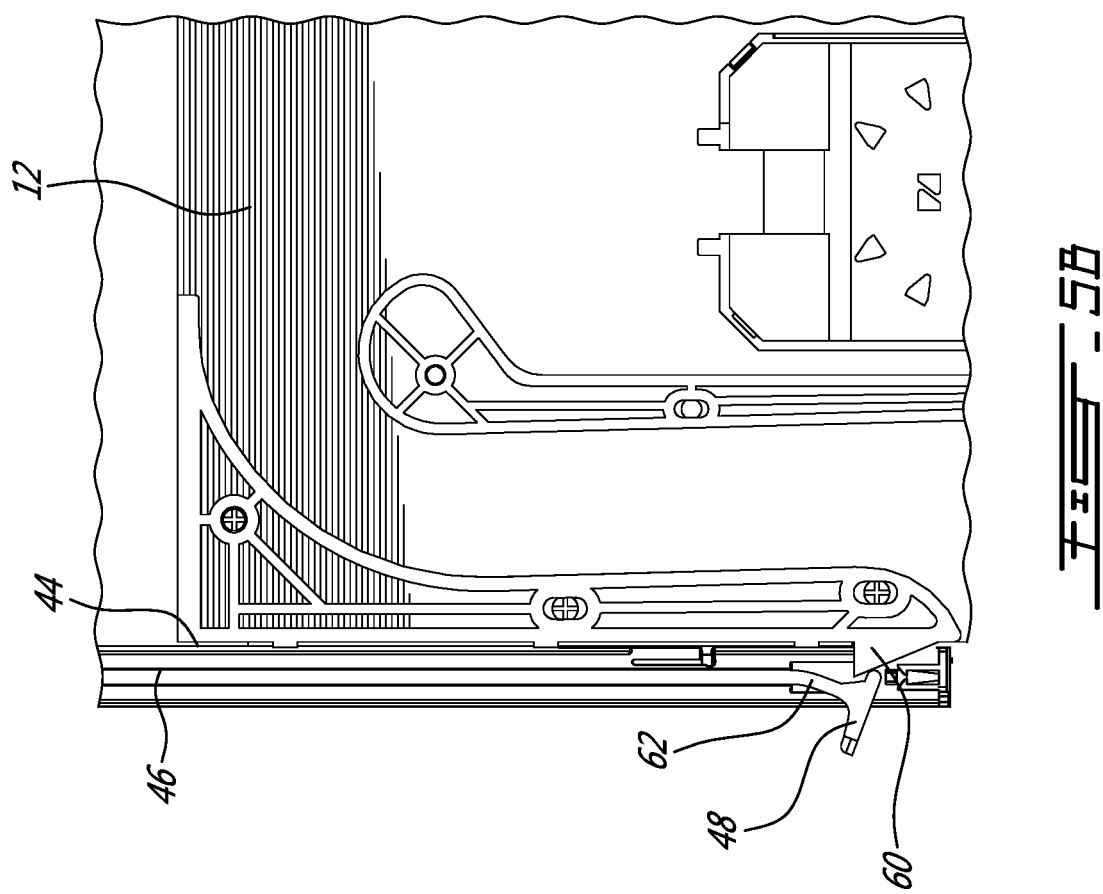

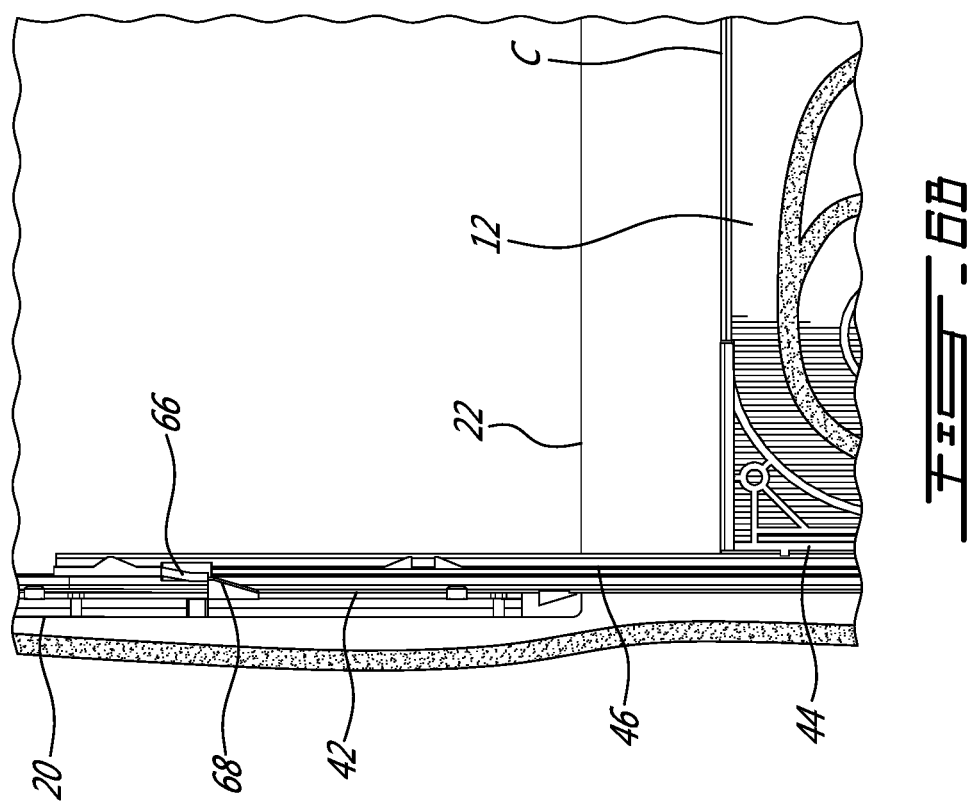

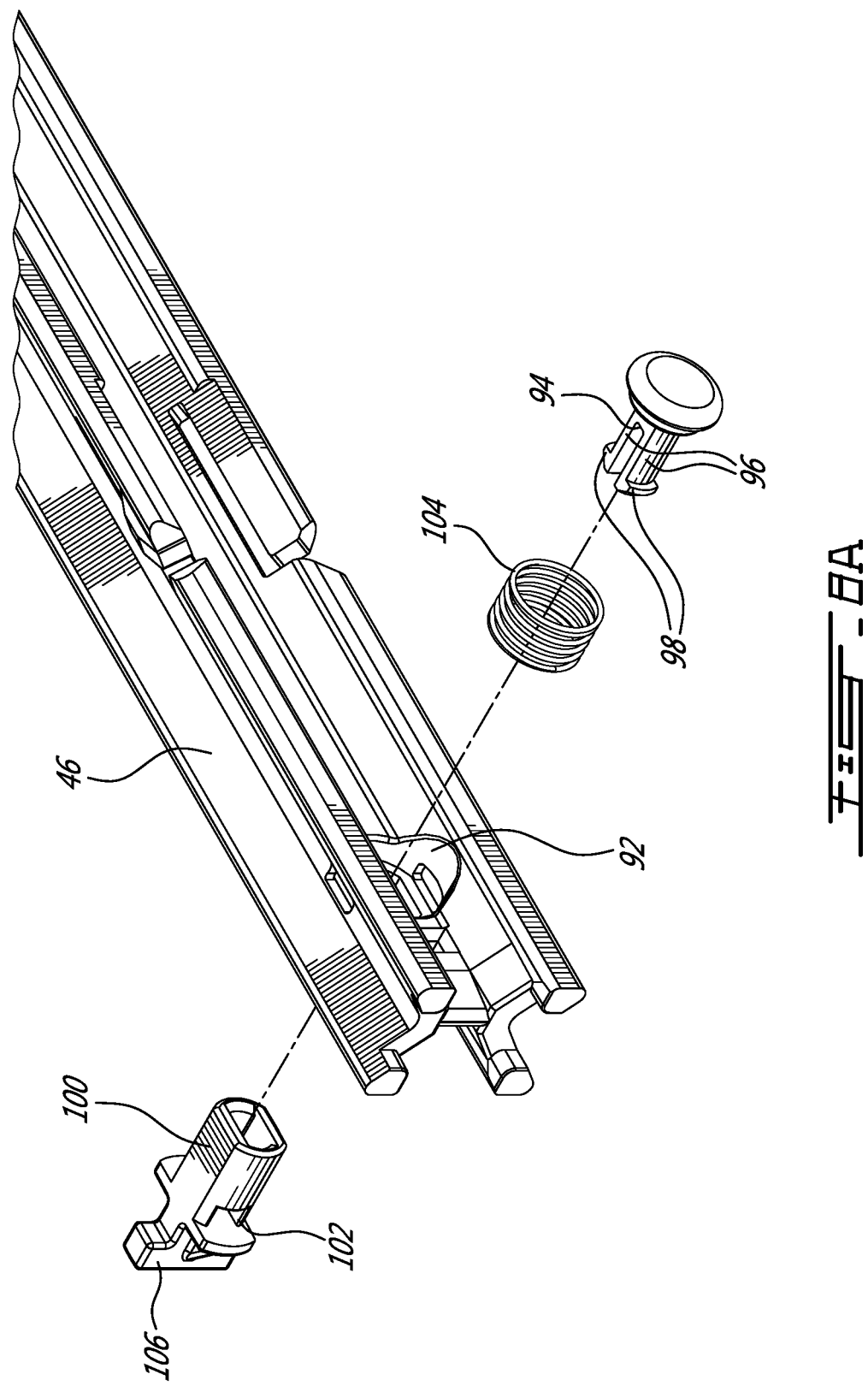

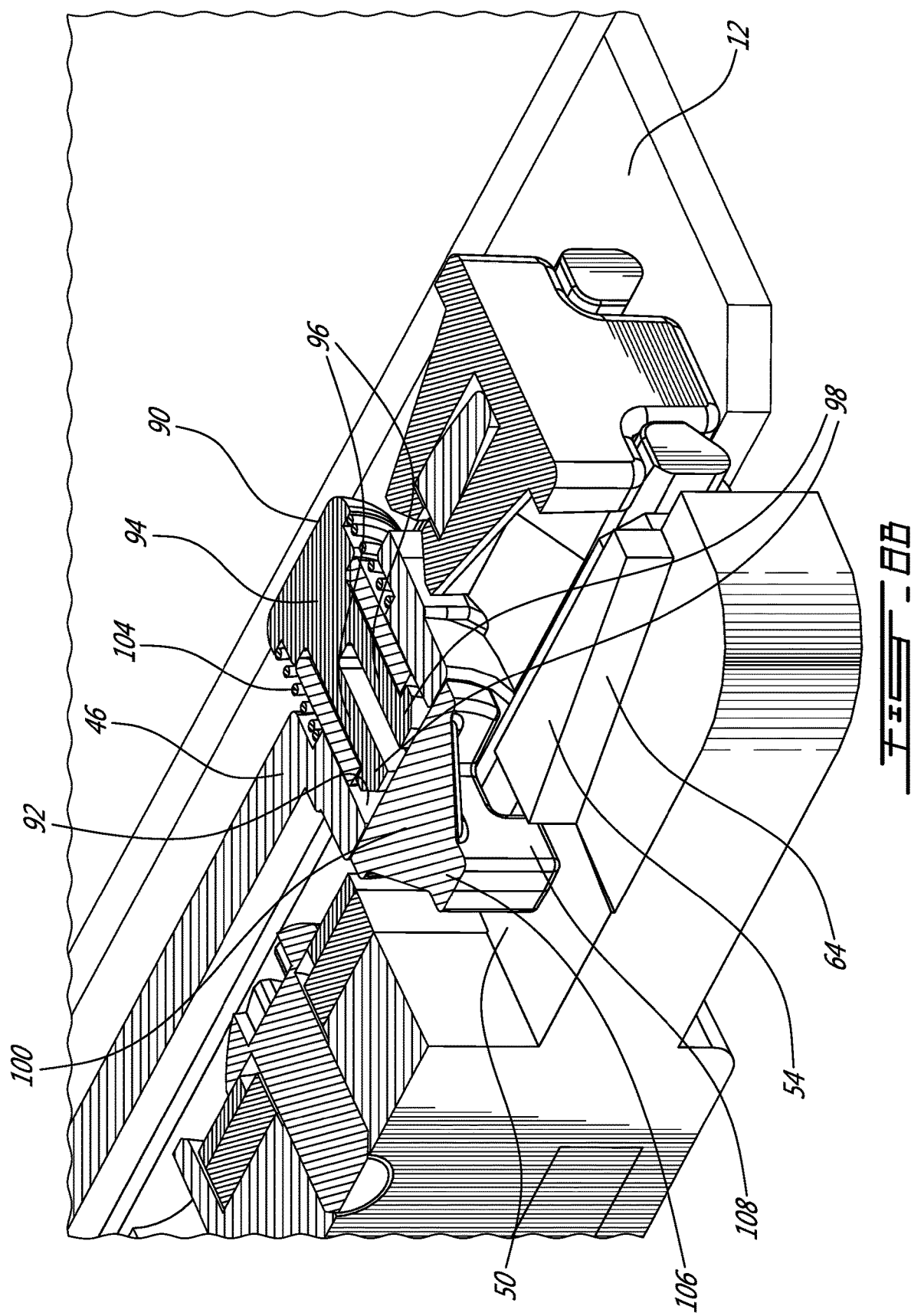

CROSS CONNECT SYSTEM AND TRAY

CROSS REFERENCE TO RELATED APPLICATIONS

This application is a Divisional of U.S. application Ser. No. 16/376,072, which itself claims benefit of U.S. provisional application Ser. No. 62/653,771 filed Apr. 6, 2018. All documents above are incorporated herein in their entirely by reference.

FIELD OF THE INVENTION

The present invention relates to a cross connect system and tray. In particular, the present application relates a cross connect system comprising a plurality of slideable trays and a sliding engagement between a case housing the trays and each tray.

BACKGROUND OF THE INVENTION

Optical cross connects are used in industries such as telecommunications to switch high-speed optical signals in a fiber optic network. Typically, fiber optic cassettes or splice boxes for such uses are removeably arranged on tray systems within a rack mounted case. In order to remove the trays from the racks for operational or maintenance purposes, rail systems are provided to allow the trays to slide out, allowing users to perform work on the cassettes or splice boxes. One drawback of current systems is that the trays cannot be fully extended out of the rack due to cable length and bend radius constraints. While partial extension provides access to the connectors at the fronts of the cassettes or splice boxes, full extension would provide easy access to the rear of the cassettes or splice boxes.

SUMMARY OF THE INVENTION

In order to address the above and other drawbacks there is provided a fiber optic system for connection to at least one external device. The system comprises a case comprising two opposed side walls defining a tray receiving space therebetween, a tray slideably received within the tray receiving space for receiving at least one device comprising a fiber optic cable exiting a rearward side of the device and for interconnecting the at least one device to the at least one external device, the tray comprising a vertical side edge and a cable guide channel comprising an exit in the vertical side edge and defining a cable receiving passage between the exit and the rearward side of the at least one device, the cable guide channel receiving the fiber optic cable for guiding at least a portion of the cable between the rearward side of the at least one device and the at least one external device via the exit, and a sliding engagement between the vertical side edge and an adjacent one of the sidewalls comprising an elongate link member comprising a first side and a second side opposite the first side, the first side mounted to the adjacent one of the sidewalls for sliding along the sidewall and the vertical side edge mounted to the second side for sliding along the second side. The tray is moveable between a closed tray position wherein the tray is received within the tray receiving space and an open tray position wherein the tray is in front of the tray receiving space via an intermediate position where the tray is partly in front of the tray receiving space and further wherein the elongate link member is stationary as the tray is moved between the closed position and the intermediate position and the elongate link member moves with the tray as the tray is moved between the intermediate position and the open position.

There is also provided a cross connect cassette system. The system comprises a case comprising two opposed side walls defining a tray receiving space therebetween, a tray slideably received within the tray receiving space for receiving a plurality of fiber optic cassettes side by side, the tray slideable between a first tray position wherein the tray is within the tray receiving space, a second tray position wherein the tray is extended partially in front of the tray receiving space and a third tray position wherein the tray is in front of the tray receiving space, and a sliding engagement between each side wall and an adjacent side edge of the tray, at least one first sliding engagement comprising an elongate link member comprising a first side mounted to the side wall for sliding along the sidewall between a stationary position and an extended position and a second side, the side edge mounted to the second side for sliding along the second side between a rearward position and a forward position, a first locking mechanism for securing the elongate link member to the sidewall in the stationary position and a second locking mechanism for securing the elongate link member to the side edge in the forward position. By moving the tray away from the first tray position towards the third tray position via the second tray position the side edge is moved away from the rearward position into the forward position disengaging the first locking mechanism and releasing the elongate link member from the retracted position and engaging the second locking mechanism and securing the elongate link member to the side edge in the forward position and for movement therewith and wherein by moving the tray away from the third tray position towards the first tray position via the second tray position the elongate link member is moved away from the extended position into the stationary position and the side edge is moved away from the forward position towards the rearward position engaging the first locking mechanism and securing the elongate link member in the stationary position while disengaging the second locking mechanism and releasing the side edge from the forward position for sliding along the second side.

Additionally, there is provided a slider comprising an elongate link member, a first elongate rail slideably mounted to the elongate link member for movement between a first position and a second position, a second elongate rail slideably mounted to the elongate link member for movement between a third position and a fourth position, and a first locking mechanism for releasably securing the a first elongate rail to the elongate link member in the first position and a second mechanism locking for releasably securing the second elongate rail to the elongate link member in the third position. Movement of the second elongate rail into the third position disengages the first locking mechanism thereby releasing the first elongate rail from the first position and the elongate link member for movement towards the second position and engages the second locking mechanism thereby releasably securing the second elongate rail in the third position to the elongate link member and wherein movement of the first elongate rail into the first position disengages the second locking mechanism thereby releasing the second elongate rail from the third position and the elongate link member for movement towards the fourth position and engages the first locking mechanism thereby releasably securing the first elongate rail in the first position to the elongate link member.

BRIEF DESCRIPTION OF THE DRAWINGS

FIG. 1 provides a right front perspective view of a cross connect system, in accordance with an illustrative embodiment of the present invention;

FIGS. 2A and 2B provide right front perspective views of a cross connect system with trays in various extended positions, in accordance with an illustrative embodiment of the present invention;

FIG. 4 provides an isolated cut left front perspective view of a slider mechanism for a cross connect system, in accordance with an illustrative embodiment of the present invention;

FIG. 5A provides an isolated right front perspective view of a slider mechanism for a cross connect system in a second tray position, in accordance with an illustrative embodiment of the present invention;

FIG. 5B provides an isolated sectional view along line VB-VB in FIG. 1;

FIG. 6B provides an isolated sectional view along line VIB-VIB in FIG. 2B;

FIG. 8A provides an isolated exploded view of an elongate link member and locking assembly in accordance with an alternative embodiment of the present invention; and FIG. 8B provides an isolated sectional view of a locking assembly in accordance with an alternative embodiment of the present invention.

DETAILED DESCRIPTION OF THE ILLUSTRATIVE EMBODIMENTS

Figure 3:
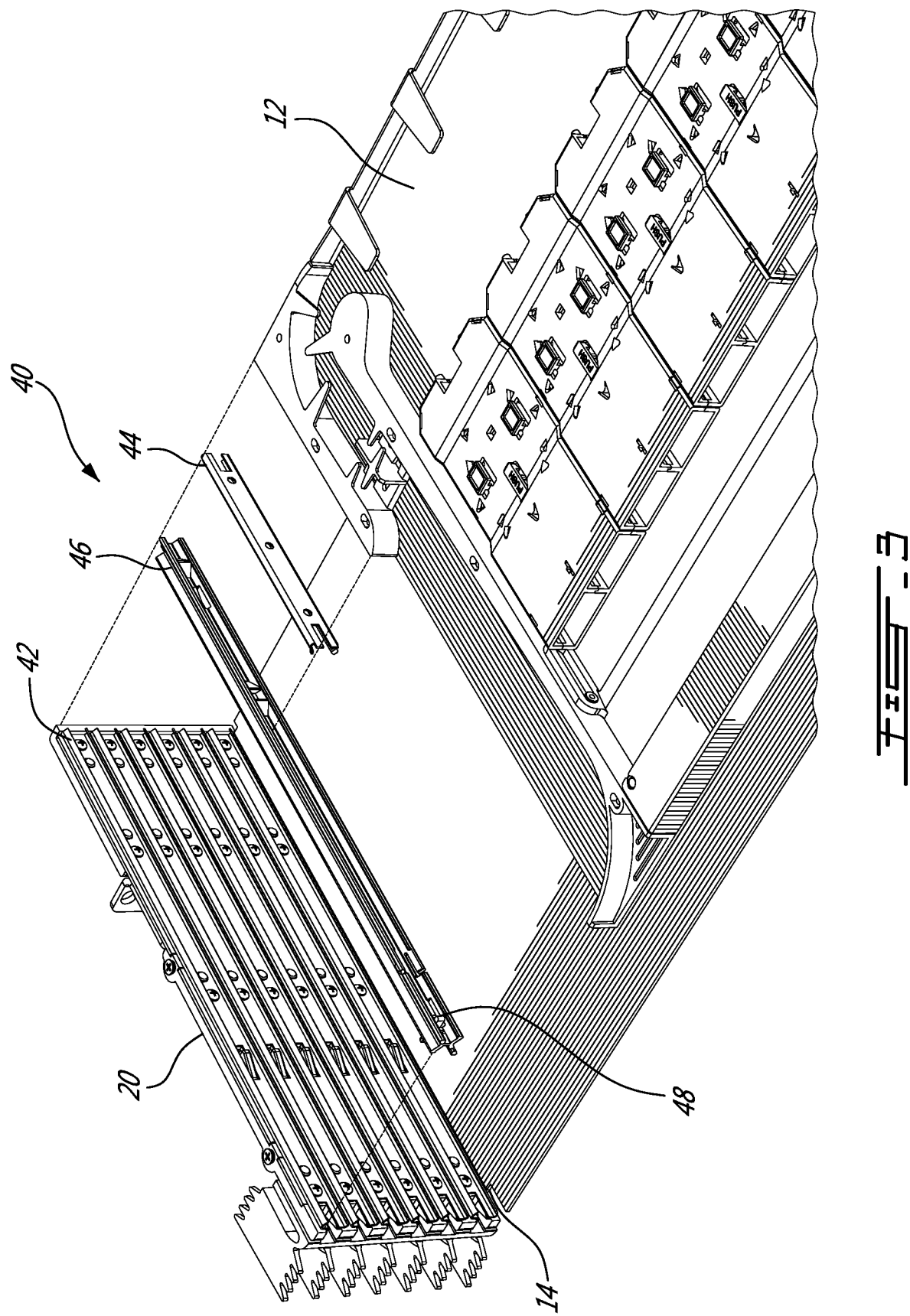
FIG. 3 provides an exploded right front perspective view of a slider mechanism for a cross connect system in a first tray position, in accordance with an illustrative embodiment of the present invention.

Referring now to FIG. 1, a cross connect system, generally referred to using the reference numeral 10, will now be described. The system 10 comprises at least one slideable tray 12 illustratively mounted within a case 14. The case 14 comprises a top cover 16, a bottom wall 18 and a pair of opposed sidewalls 20 defining a tray receiving space 22 therebetween. The case 14 is illustratively mountable to the rails of a rack (not shown) via a pair of mounting brackets 24 wherein one of the brackets 24 is attached to an outer surface of a respective one of the sidewalls 20. The front edges of the top cover 16 and walls 18, 20 define an opening via which the tray receiving space 22 can be accessed. In an embodiment, top cover 16 is removably attachable to the case 14 via fasteners 26. Illustratively, each tray 12 is slideably positionable between a first closed tray position (A) where the tray 12 is within the tray receiving space 22, a second intermediate tray position (B) where a portion of the tray 12 is in front of the tray receiving space 22 and a third open tray position (C) where the tray 12 is positioned in front of the tray receiving space 22 and accessible, as will be discussed in further detail below.

Referring now to FIGS. 2A and 2B in addition to FIG. 1, each tray 12 receives a plurality of devices 28 such as removable fiber optic modules or cassettes illustratively arranged side by side on an upper surface 30 thereof. In an embodiment, each fiber optic device 28 is secured to the tray 12 using a fastener comprising tabs (not shown) of inverted "T" cross section which engage with respective slots 32 machined or otherwise formed in the tray 12. Each device 28 typically comprises a plurality of receptacle modules (not shown) arranged in a row along a forward edge of the device 28. Each cassette also terminates a fiber optic cable 34, such as a trunk cable or the like, comprising a plurality of optic fibers at a rearward edge of the device 28. Cables 34 exiting the rear of device 28 for connection to external devices (not shown) are directed to a cable guiding channel 36 on illustratively the left side of the tray 12, where the cables 34 exit the tray and are directed towards cable supports 38 mounted to the outside of a sidewall 20.

Still referring now to FIGS. 2A and 2B, as discussed above the devices 28 are illustratively fiber optic cassettes comprising a plurality of optic fibres (not shown) interconnecting each optic fiber of the fiber optic cable 34 with a respective one of a plurality of receptacles (not shown) arrange along a front face of each of the fiber optic cassettes. The receptacles are illustratively configured for receiving a complementary plug of one of a plurality of optic fibers (both not shown) in a cross connect configuration. The plurality of optic fibers enter the tray via a passageway 39 positioned at a side of the tray 12.

Referring now to FIG. 3, a side edge of each tray 12 is mounted to a respective sidewall 20 of the case 14 via a pair of sliding engagements, or sliders 40. At least one of the sliders 40 comprises a first elongate rail 42 attached to a sidewall 20, a second elongate rail 44 attached to a side of the tray 12, and an elongate link member 46 arranged in parallel to and slideably interconnecting the first elongate rail 42 and the second elongate rail 44. The sliders 40 allow the tray 12 to slide in and out of tray receiving space 22 between the first closed tray position wherein the tray 12 is fully recessed inside tray receiving space 22, the second intermediate tray position wherein the tray 12 is partially outside of tray receiving space 22, and the third open tray position wherein the tray is fully outside of tray receiving space 22.

Referring now to FIG. 4 in addition to FIG. 3, an elongate link member 46 comprising a T-shaped flexible latch 48 that is held inside a latch slot 50 in a respective sidewall 20 is provided. In the first tray position the ends 52 of the latch 48 are each engaged by a respective one of a pair of wedge shaped features 54 which are illustratively moulded into the sidewall 20 to form a first locking mechanism, securing the elongate link member 46 in place while the tray 12 is free to slide between first tray position and second tray position. As a result, between the first tray position and the second tray position, both the first elongate rail 42 and the elongate link member 46 are stationary, while the second elongate rail 44 is slideable along the elongate link member 46.

Referring now to FIG. 5A, as the tray 12 is slid to the second tray position B, a second locking mechanism comprising a pair of opposed flexible tabs 56 on the elongate link member 46 are engaged by the forward edge 58 of the second elongate rail 44 and such that they are deflected towards one another and slide along an inner surface of the second elongate rail 44. In this manner the second elongate rail 44 and elongate link member 46 are engaged with an increased friction but still able to slide respective to one another.

Referring to FIG. 5B, as the second elongate rail 44 continues to be slid vis-à-vis the elongate link member 46, an abutment 60 on the left edge of the tray 12 engages the flexible latch 48. The flexible latch 48 flexes out of the path of the abutment 60 against the bias of the flexible stem 62 and such the ends 52 of the latch 48 clear the wedge shaped features 54 releases the elongate link member 46 from the latch slot 50, thereby allowing the elongate link member 46 to slide relative to the sidewall 20 from the second tray position to the third tray position. Conversely, as the tray 12 is slid from the third tray position to the second tray position, the ends 52 of the T-shaped latch 48 slide up the angled outer surfaces 64 of the wedge shaped features 54 against the bias of the flexible stem 58 until the wedge shaped features 54 are cleared and the ends 52 of the T-shaped latch 48 are returned into the latch slot 50.

Figure 6A:
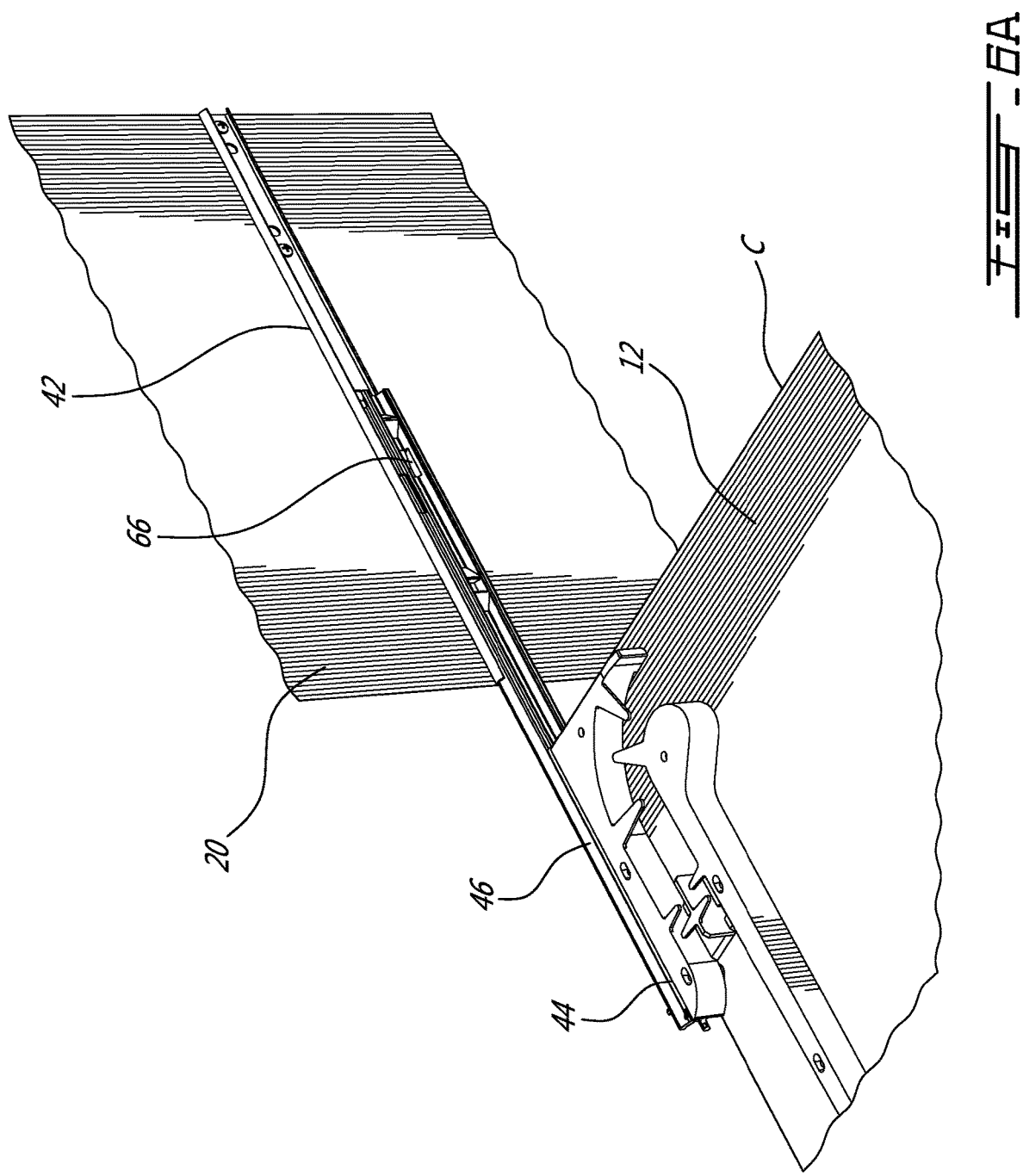
FIG. 6A provides an isolated right front perspective view of a slider mechanism for a cross connect system in a third tray position, in accordance with an illustrative embodiment of the present invention.

Referring now to FIGS. 6A and 6B, once the tray 12 is slid to the third tray position, a tab 66 engages a stop 68 preventing the tray 12 from sliding any further away from the tray receiving space 22. With the tray 12 in the third tray position, both the front and the rear of the cassettes 28 are easily accessible for operational and maintenance purposes.

As a person of ordinary skill in the art will now understand, the steps of sliding the tray 12 out of the tray receiving space 22 may be repeated in reverse to slide the tray 12 back into the tray receiving space 22. Between the third tray position and the second tray position, the second elongate rail 44 and the elongate linking member 46 slide together as the tray 12 enters the tray receiving space 22. As discussed above, as the tray 12 reaches the second tray position, the abutment 60 on the side of the tray 12 releases the latching mechanism 48 and the latching mechanism 48 re-enters the latch slot 50, thus fixing the elongate link member 46 in place and allowing the second elongate rail 44 to slide along the elongate link member 46 as the tray further slides in tray receiving space 22 towards the first tray position A.

Referring back to FIGS. 2A and 2B in addition to FIG. 6B, the sliding mechanism 40 ensures that each tray 12 exits the tray receiving space 22 sufficiently before the elongate link member 46 is released from the first elongate rail 42 and may begin to slide along with the tray 12. Additionally, sliding mechanism 40 ensures that elongate link member 46 completely enters the tray receiving space 22 before it reengages with the first elongate rail 42 and allows the tray 12 to slide into the tray receiving space 22 along elongate link member 46. This mechanism ensures that during movement of the tray 12 the fiber optic cables 34, which are received in the guiding channel 36 and directed towards the cable supports 38, do not engage the sidewall 20 or elongate link member 46, which could otherwise damage or foul the movement of the fiber optic cables 34. In addition, sliding mechanism 40 ensures that the fiber optic cables 34 maintain a substantially constant bend radius when wrapping around the corner of the case 14 while minimizing the required length of the fiber optic cables 34.

Figure 7A:
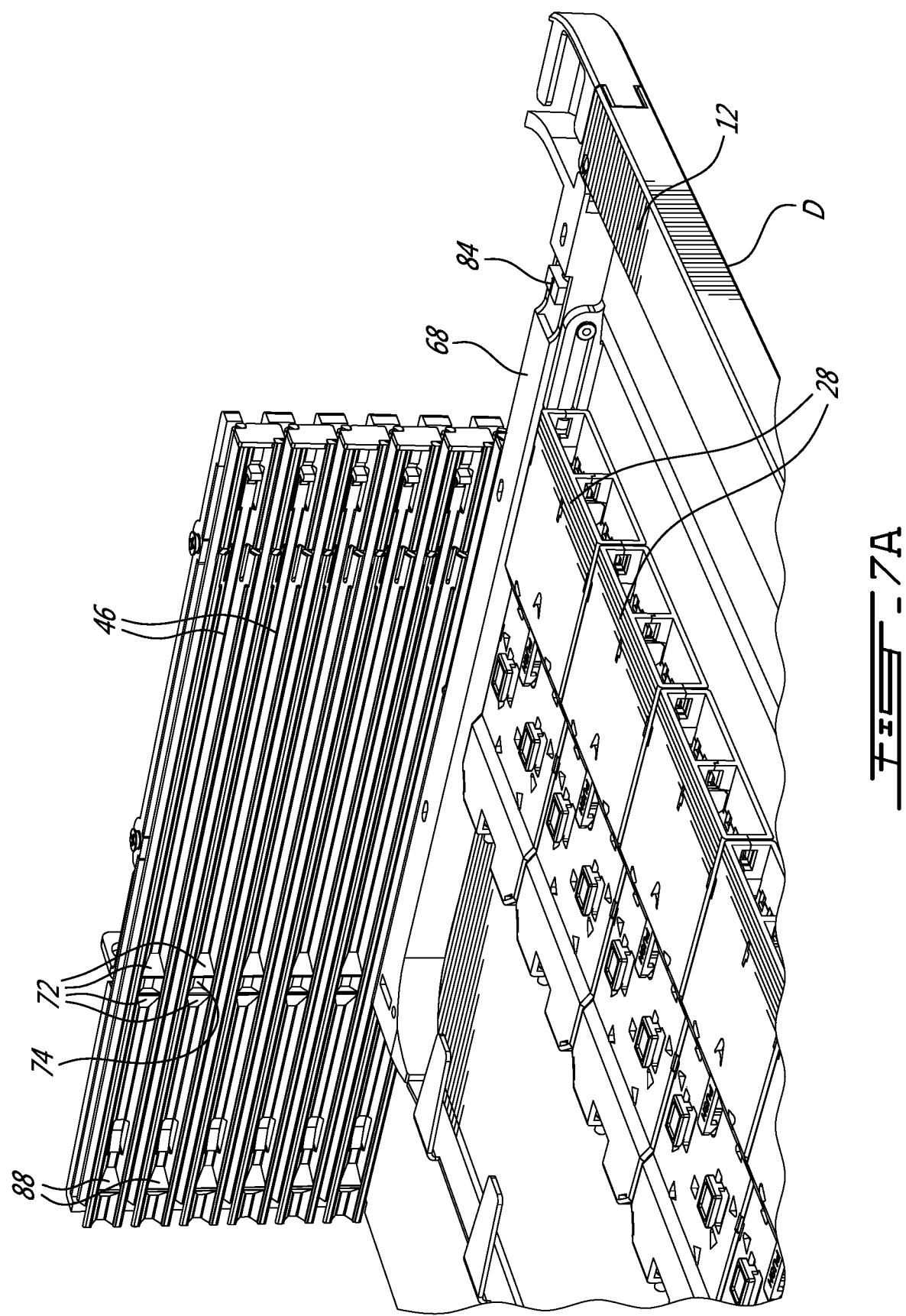
FIG. 7A provides a left front perspective view of locking and retention mechanisms for a cross connect system, in accordance with an illustrative embodiment of the present invention.
Figure 7C:
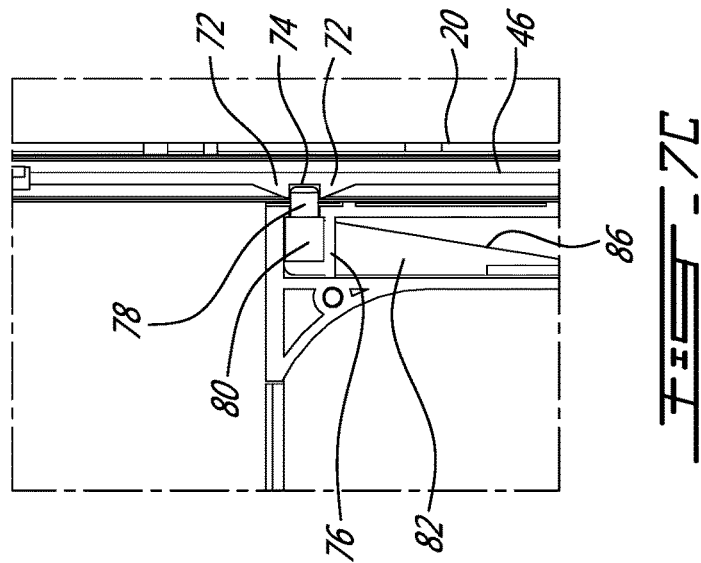
FIG. 7C provides an isolated sectional view of the sectional view of FIG. 7B.
Figure 7B:
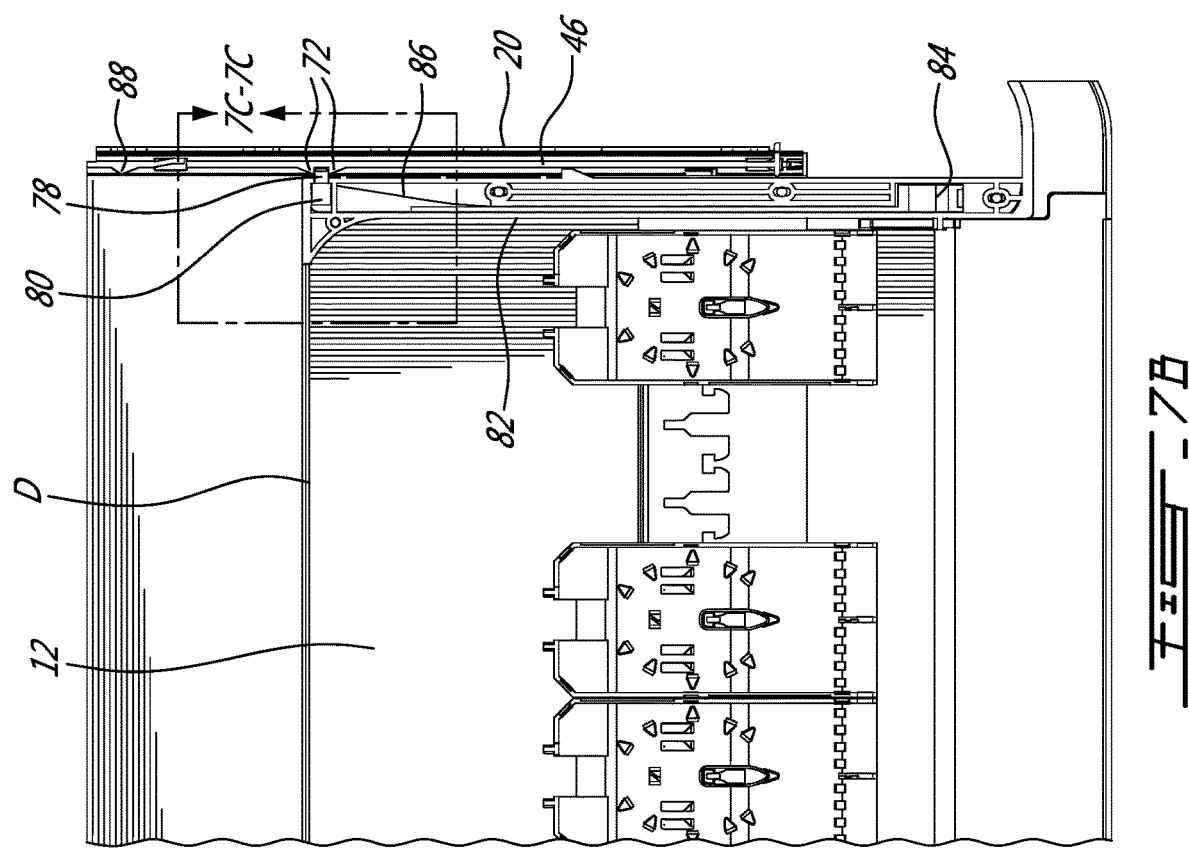
FIG. 7B provides a sectional view along line VIIB-VIIB in FIG. 2A.

Referring now to FIGS. 7A to 7C in addition to FIG. 1, in order to retain the tray 12 in a fourth tray position D, an actuatable lock is provided. The lock engages pair of angled walls 72 and a recess 74 to retain tray 12 in the fourth tray position whereby cassettes 28 are easily accessible, for example for patching purposes. The actuatable lock comprises a plunger assembly 76 comprising a plunger 78 retained in a plunger housing 80. The plunger 78 is biased away from the housing 80 by a spring (not shown). The plunger assembly 76 is moveable away from the sidewall 20 by a release mechanism comprising a slide 82 which extends from a finger actuator 84 positioned towards the front of the tray 12 to the plunger assembly 76. The plunger assembly 76 is held such that it may move only laterally relative to the tray 12 but comprises bevelled walls 86 which interact with bosses (not shown) on the release mechanism 82. As the slide 82 is pulled forward, the bosses impart a lateral force on the plunger mechanism 76 via the bevelled walls 86 and such that the plunger mechanism 76 is moved away from the sidewall 20 and disengaged from the recess 74.

Still referring to FIGS. 7A to 7C, when the tray 12 is slid into the fourth tray position from either direction, the plunger 78 engages one of the angled walls 72 and retracts into the plunger housing 80 against the bias of the spring. Once the angled wall 72 is cleared, the plunger 78 is biased by the spring into the recess 74, locking the tray 12 into the fourth tray position. To unlock the tray 12 from the fourth tray position D and allow it to once again freely slide in and out of the tray receiving space 22, the finger actuator 84 is pulled, causing the slide 82 to move forward and the plunger assembly 76 to move laterally, freeing the plunger 78 from the recess 74.

Still referring to FIGS. 7A to 7C in addition to FIG. 1, each elongate link member 46 further comprises a retention means for holding the tray 12 in the first tray position whereby the tray 12 is within the tray receiving space 22. In an embodiment, the retention means comprises an angled protrusion 88 requiring the tray 12 to be pulled with enough force to cause the plunger 78 to compress the spring and retreat into the housing 80. As the protrusion 88 is angled on both of its sides, the same amount of force is required to pull the tray 12 out of the first tray position or to push the tray 12 into the first tray position.

Referring now to FIGS. 8A and 8B, in an alternative embodiment, the first locking mechanism comprises a push latch assembly 90 mounted for movement within an aperture 92 in the elongate link member 46. The push latch assembly 90 comprises a first latch part 94 comprising a pair of flexible fingers 96 each comprising a hooked end 98 which are inserted into a second latch part 100. The pair of flexible fingers 96 engage respective ones of a pair of opposed cutaways 102 in the second latch part 100 thereby securing the first latch part 94 to the second latch part 100. Prior to assembly a spring 104 is placed about second latch part 100 and such that, when the push latch assembly 90 is assembled, the spring 104 biases the assembly. The second latch part 100 further comprises a T-shaped end 106 which is held within the latch slot 50. In the first tray position the tips 108 of the latch T-shaped end 106 are each engaged by a respective one of the pair of wedge shaped features 54.

Still referring to FIGS. 8A and 8B, as will know be understood by a person of ordinary skill in the art, as the tray 12 is moved into the second tray position B from the first tray position A, the abutment (reference 60 in FIG. 5A) engages the button-like end 110 of the first latch part 94. This forces the push latch assembly 90 to move laterally against the bias of the spring 104 and the tips 108 of the T-shaped end 106 out of the latch slot 50. The elongate link member 46 is then released such that it can travel together with the tray 12. As the tray 12 is moved into the second tray position B from the third tray position C, the tips 108 of the T-shaped end 106 travel along the angled outer surfaces 64 against the bias of the spring 104 and once clearing the wedge shaped features 54 are moved into the latch slot 50 under bias of the spring 104.

While system 10 has herein been described as comprising trays 12 with a slider mechanism 40 on their left side and locking means 58 on their right side, it is to be understood that a mirrored configuration may also be implemented. In an embodiment, mirrored systems 10 may be used side by side to maximize spatial efficiency.

Although the present invention has been described hereinabove by way of specific embodiments thereof, it can be modified, without departing from the spirit and nature of the subject invention as defined in the appended claims.

The invention claimed is:
1. A slider comprising:
a fixed elongate rail;
an elongate link member slideably mounted to the fixed elongate rail for movement relative to the fixed elongate rail between a first position and a second position;
a moveable elongate rail slideably mounted to the elongate link member for movement relative to the elongate link member between a third position and a fourth position;
a first locking mechanism for releasably securing the elongate link member to the fixed elongate rail in the first position and a second locking mechanism for releasably securing the moveable elongate rail to the elongate link member in the third position;
a surface defining a slot, the surface in a fixed relationship with the fixed elongate rail;
wherein when the elongate link member is secured to the fixed elongate rail in the first position by the first locking mechanism, movement of the moveable elongate rail into the third position disengages the first locking mechanism thereby releasing the elongate link member from the first position and the fixed elongate rail for movement towards the second position and engages the second locking mechanism thereby releasably securing the moveable elongate rail to the elongate link member in the third position;
wherein when the moveable elongate rail is secured to the elongate link member in the third position by the second locking mechanism, movement of the elongate link member into the first position disengages the second locking mechanism thereby releasing the moveable elongate rail from the third position and the elongate link member for movement towards the fourth position and engages the first locking mechanism thereby releasably securing the elongate link member to the fixed elongate rail in said first position; and
wherein the first locking mechanism comprises a latch on the elongate link member held within the slot and further wherein sliding the moveable elongate rail into the third position forces the latch out of the slot thereby releasing the first locking mechanism and the elongate link member from the first position.

2. The slider of claim 1, wherein the second locking mechanism comprises a friction fit between the elongate link member and the moveable elongate rail when the second elongate rail is in the third position.

3. The slider of claim 2, wherein as the moveable elongate rail moves from the third position towards the fourth position, the friction fit between the elongate link member and the moveable elongate rail is disengaged.

4. The slider of claim 1, wherein an abutment affixed on the moveable elongate rail forces the latch out of the slot when the moveable elongate rail is moved into the third position.

5. The slider of claim 4, wherein the moveable elongate rail is affixed to a tray comprising the abutment.

6. The slider of claim 1, wherein the fixed elongate rail is affixed to a surface comprising the slot.

7. A slider comprising:
a first fixed elongate rail;
an elongate link member mounted to the first fixed elongate rail for sliding relative to the first fixed elongate rail between a first position and a second position;
a second elongate rail mounted to the elongate link member for sliding relative to the elongate link member between a third position and a fourth position;
a surface defining a slot, said surface in a fixed relationship with the first fixed elongate rail;
wherein when the elongate link member is releasably secured to the first fixed elongate rail in the first position by a latch on the elongate link member held within the slot, sliding of the second elongate rail into the third position forces the latch out of the slot thereby releasing the elongate link member from the first position and the first fixed elongate rail for sliding towards the second position and releasably secures the second elongate rail to the elongate link member in the third position; and
wherein when the second elongate rail is held to the elongate link member in the third position, sliding of the elongate link member into the first position releases the second elongate rail from the third position and the elongate link member for sliding towards the fourth position and releasably secures the elongate link member to the first fixed elongate rail in the first position.

8. The slider of claim 7, further comprising a second locking mechanism for releasably securing the second elongate rail to the elongate link member in the third position.

9. The slider of claim 8, wherein the second locking mechanism comprises a friction fit between the elongate link member and the second elongate rail when the second elongate rail is in the third position.

10. The slider of claim 9, wherein as the second elongate rail moves from the third position towards the fourth position, the friction fit between the elongate link member and the second elongate rail is disengaged.

11. The slider of claim 7, wherein an abutment affixed on the second elongate rail forces the latch out of the slot when the second elongate rail is moved into the third position.

12. The slider of claim 7, wherein the first fixed elongate rail is affixed to the surface comprising the slot.

13. The slider of claim 12, wherein the second elongate rail is affixed to a tray comprising the abutment.

14. A slider for securing a tray to a surface, the slider comprising:
a first elongate rail attached to the surface;
an elongate link member configured for sliding relative to the first elongate rail between a first position and a second position;
a first assembly configured for releasably holding the elongate link member in the first position;
a second elongate rail attached to the tray and configured for sliding relative to the elongate link member between a third position and a fourth position;
a second assembly configured for releasably holding the second elongate rail in the third position;
wherein the surface defines a slot in a fixed relationship with the first elongate rail;
wherein the first assembly comprises a latch on the elongate link member;
wherein the latch is held within the slot such that the elongate link member is held to the first elongate rail in the first position, moving the tray such that the second elongate rail slides into the third position forces the latch out of the slot thereby releasing the elongate link member from the first elongate rail for sliding towards the second position and holds the second elongate rail to the elongate link member in the third position; and
wherein when the second elongate rail is held by the second assembly to the elongate link member in the third position, moving the tray such that the elongate link member slides into the first position releases the second elongate rail from the elongate link member for sliding towards the fourth position and holds the elongate link member to the first elongate rail in the first position.

15. The slider of claim 14, wherein the second assembly comprises a friction fit between the elongate link member and the second elongate rail when the second elongate rail is in the third position.

16. The slider of claim 14, wherein the first elongate rail is mounted to a first side of the elongate link member in a sliding relationship and the second elongate rail is mounted to a second side of the elongate link member in a sliding relationship.

17. The slider of claim 16, wherein the second side is opposite the first side.

18. The slider of claim 14, wherein an abutment affixed on the second elongate rail forces the latch out of the slot when the second elongate rail is moved into the third position.

19. The slider of claim 18, wherein the second elongate rail is affixed to a tray comprising the abutment.

\* \* \* \* \*